United States Patent [19]
Nahlovsky et al.

[11] Patent Number: 5,211,777
[45] Date of Patent: May 18, 1993

[54] DESENSITIZATION OF WASTE ROCKET PROPELLANTS

[75] Inventors: Boris D. Nahlovsky, Cameron Park; Brian T. Gilligan, Shingle Springs; Edward S. Michalik, El Dorado Hills, all of Calif.

[73] Assignee: Aerojet-General Corporation, Folsom, Calif.

[21] Appl. No.: 862,019

[22] Filed: Apr. 2, 1992

[51] Int. Cl.⁵ .............................................. C06B 23/00
[52] U.S. Cl. ............................ 149/109.6; 149/19.92; 149/124; 588/202
[58] Field of Search ................ 149/109.6, 124, 19.92; 588/202

[56] References Cited

U.S. PATENT DOCUMENTS

| | | | |
|---|---|---|---|
| 695,348 | 3/1902 | Steiner. | |
| 1,674,163 | 6/1928 | Diederichs. | |
| 3,689,243 | 9/1972 | Onozawa | 44/17 |
| 3,930,844 | 1/1976 | Parrish | 75/101 R |
| 4,169,709 | 10/1979 | Stima | 44/10 R |
| 4,201,551 | 5/1980 | Lyshkow | 44/1 D |
| 4,231,822 | 11/1980 | Roth | 149/124 |
| 4,236,897 | 12/1980 | Johnston | 44/10 A |
| 4,474,629 | 10/1984 | York et al. | 149/109.6 |
| 4,596,584 | 6/1986 | Darby | 44/1 D |
| 4,758,387 | 7/1988 | Sayles | 264/3.1 |
| 4,769,044 | 9/1988 | Cornwell | 44/605 |
| 5,028,284 | 7/1991 | Cox et al. | 149/21 |

FOREIGN PATENT DOCUMENTS 441835 3/1935 United Kingdom.
2133036A 7/1984 United Kingdom.

*Primary Examiner*—Edward A. Miller

[57] ABSTRACT

Waste solid energetic compositions such as waste solid rocket propellant are desensitized for purposes of disposal and burning by being combined with a diluent and a filler which lower the sensitivity, energy output and flame temperature of the compositions and improve their ability to burn in a controlled manner by increasing the burn time. The diluent is an oil with a viscosity of at least about 600 centipoise, and the filler is any of a variety of solid organic material, preferably agricultural waste or wood flour.

14 Claims, No Drawings and 5,211,777

DESENSITIZATION OF WASTE ROCKET PROPELLANTS

This invention lies in the field of solid rocket propellants and related compositions, and relates to methods for the disposal of waste compositions of this nature.

BACKGROUND OF THE INVENTION

Energetic compositions such as those used as explosives and propellants present a well-recognized problem when it becomes necessary to dispose of such materials as waste. Waste occurs for example as the result of the regraining of rocket motors, and in similar situations with similar materials for a variety of reasons. Early methods of disposal of these compositions involved deep water or ocean dumping, which is now prohibited by law. One method in current use is open-pit burning, although a continuing concern with open-pit burning is the risk of ground water and air pollution. As a result, each use of this method requires a special exemption from regulatory authorities. The alternative of incinerator burning offers certain advantages, but the scrubbers used to control emissions from incinerators produce liquid waste which has its own disposal problems. The cost of the supplemental fuel needed to run an incinerator is a further deterrent. A variety of other alternatives have been investigated, including such methods as binder solvolysis, wet air oxidation, supercritical fluid extraction and/or oxidation, electrolysis and biodegradation.

Controlled burning in a closed system is potentially both cost-effective and environmentally safe. The approach taken by this invention is to convert the waste propellant to a form which is suitable for this type of disposal and which is sufficiently desensitized that energy output and flame temperature are reduced. This prevents incinerator damage and reduces hazards related to propellant storage and the charging of incinerators with propellant.

SUMMARY OF THE INVENTION

It has now been discovered that waste solid energetic compositions can be combined with a combination of diluent and filler to lower the energy output and burn rate and yet provide the compositions with a consistency which permits them to be easily extruded into pellets or other small pieces of controlled size. In accordance with this invention, waste propellant (or other energetic) material is combined with an oil having a viscosity of at least about 600 centipoise, and any of a variety of different types of particulate organic matter. When appropriate proportions are used, the combination has a considerably lower flame temperature and energy output during burning, and burns at a much slower rate than does live propellant. The combination is both castable and extrudable, which permits it to be safely transported, handled and stored in dry form. When extruded into pellets, the composition may be burned in a highly controlled manner at a safe, rapid rate.

These and other features, applications and advantages of the invention will become apparent from the description which follows.

DETAILED DESCRIPTION OF THE INVENTION AND PREFERRED EMBODIMENTS

While the following discussion addresses solid rocket propellants in detail, the present invention applies to energetic compositions in general.

Oils which may be used as diluents in the practice of this invention include substances from a wide variety of sources. Examples are animal oils with a high fatty acid content, including those naturally occurring as fats, such as tallow, lard and stearic acid, as well those naturally occurring as liquids, such as fish oils, fish liver oils, oleic acid and sperm oil. Further examples are vegetable oils from seeds and nuts, such as linseed, tung, oiticica, soybean, corn, cottonseed, castor coconut and palm oils. Still further examples are petroleum oils and petroleum-derived oils, such as wax-base oils, asphalt-base oils, naphthenic and aromatic mineral oils, engine oils (including diesel oil), machine oils, and cutting oils. Petroleum-derived oils and vegetable oils are preferred, and mineral oils and automotive oils are particularly preferred.

High viscosity oils offer the benefit of being easily cast. Accordingly, preferred oils are those with a viscosity of at least about 600 centipoise, more preferably about 800 centipoise to about 1400 centipoise, and most preferably from about 900 centipoise to about 1200 centipoise. For automotive oils, the viscosity may be expressed in terms of the SAE number, which preferably ranges from about 10 to about 50.

The organic matter used as a filler may be any of a wide variety of solid organic matter in particulate or flour form which provides the desensitized propellant with beneficial consistency and burning characteristics. Examples of sources for this material are various kinds of woods, nutshells, grains, starches, and agricultural and food waste materials such as bagasse and corncob. Of wood-derived materials, hardwood flours are preferred. Examples are flours of aspen, beech, white and yellow birch, red and sugar maple, sweet gum, American elm and southern red oak. Softwoods may also be used, however. Examples are eastern white cedar, eastern hemlock, jack pine, eastern white pine, loblolly pine, Douglas fir, black spruce, white spruce and tamarack. Examples of nutshell-derived materials are shells of almond, beechnut, Brazil nut, coconut, hazelnut, hickory nut, peanuts, pecans, pistachio nuts, black walnuts and Persian walnuts. Examples of grain flours are wheat flour and rice flour.

The proportions of the diluent and filler relative to the entire combination may vary. Optimal proportions for any particular combination will depend on such considerations as cost, consistency, castability, burning characteristics and hazard characteristics. The most desirable compositions will be those which have a consistency prior to cure which permits them to be extruded into pellets. The ability to be cast by extrusion provides control over the pellet size and permits the use of conventional extrusion equipment. Optimal burning characteristics will generally be a flame temperature of at least about 1000° F. (538° C.), preferably at least about 1500° F. (816° C.), and most preferably from about 1500° F. to about 2000° F. (816° C. to 1093° C.). Hazard characteristics may be related to those of the waste propellant itself prior to being combined with the diluent and filler. In optimal combinations, the parameters of the hazard characteristics, such as for example the Bureau of Mines impact test, will be less than about 25% of that of the propellant. Optimal hazard characteristics in terms of this test will generally be a drop height of at least about 60 cm, preferably a drop height of at least about 75 cm, and most preferably a drop height of at least about 90 cm, all based on a 2 kg test weight.

With these considerations in mind, the preferred proportions of diluent and filler in most applications will range from about 15% to about 60% by weight each, and preferably from about 25% to about 40% by weight each, relative to the entire combination.

Additional components may also be included in preparing the desensitized composition, although in most cases, compositions of the desired properties may be achieved without their inclusion. Such additives may be binders, thickening agents, anti-sticking agents and desensitizing agents. Examples of binders are waxes; examples of thickening agents are glycerides and thixotropic agents in general; examples of anti-sticking agents are powders; and examples of desensitizing agents are oxalic acid and oxalic acid salts such as ammonium oxalate. These additives may be used alone or in combination, in appropriate proportions and amounts which will be readily apparent to those routinely skilled in the use of these materials.

To form the desensitized composition, the diluent and filler may be mixed with the propellant in any conventional manner. Optimal methods will be those which achieve a substantially uniform and homogeneous consistency and keep the composition in a fluid state so that it can be extruded or otherwise separated and shaped into small pieces and solidified. Solidification will occur as the extruded composition is left standing, by the absorption of the liquid diluent by the solid components. In most applications, an elevated temperature will benefit the mixing process. A preferred temperature range is about 70° F. to about 100° F. (21° C. to 38° C.).

The size of the pieces or pellets into which the desensitized composition is formed may also vary. Pellets of small size offer the advantage of greater burning rate control in terms of even burning at a controlled temperature due to their exposed surface area. On the other hand, the pellets must be large enough to maintain homogeneity. In most applications, pellets of optimal size will be less than about 1 inch (2.54 cm) in diameter and 2 inches (5.08 cm) in length, with pellets of less than about 0.5 inch (1.27 cm) in diameter and 0.5 inch (0.63 cm) in length preferred.

The following examples are offered for illustrative purposes, and are intended neither to limit nor to define the invention in any manner.

EXAMPLES

A series of mixtures were prepared by combining a composite ANB propellant with a variety of diluents, fillers and additives. The composition of the composite ANB propellant is as follows (all percentages are by weight):
 Fuel: aluminum, 15%
 Binder: polybutadiene, 10%
 Oxidizer: ammonium perchlorate, 73%
 Plasticizer: polybutylene, 2%

A quantity of 500 g of each mixture was prepared by mixing the ingredients in a conventional Baker-Perkins vertical mixing device, which is commonly used in the solid propellant industry, at a temperature of 77° F. (25° C.). Once mixed, the mixtures were permitted to solidify in the form of a block. The solidified mixtures were then subjected to the standard Impact Test of the United States Bureau of Mines, using a 2 kg weight, and the flame temperature for each was determined in an open pit burning test.

The results of these tests together with observations regarding the physical form and cast characteristics are listed in Table 1. The data indicates that oils such as mineral oil, diesel oil, Valvoline motor oil, Crisco vegetable oil and corn oil are superior to such diluents as isopropyl alcohol, glycerin, ethylene glycol, diethylene glycol, and water, and that the hardwood flour/mineral oil combination is especially effective.

The hardwood flour/mineral oil combination, using two viscosities of mineral oil, was prepared by mixing uncured inert propellant with the hardwood flour and mineral oil in equal proportions by weight. Pellets were prepared by mixing the ingredients in a mixer/extruder with a screw conveyer and two mix baffles with ¼-inch (0.64 cm) holes. Mixing and extrusion were performed at 77° F. (25° C.), and the resulting pellets were ¼ inch (0.64 cm) in diameter and 1 inch (2.54 cm) in length. Burning characteristics were determined in open pit burn tests, while hazard characteristics, which included the Bureau of Mines Impact Test, a differential thermal analysis (DTA), a rotary friction test and a spark test, all performed in accordance with procedures which are standard in the explosives industry, were also determined.

The results are listed in Table 2, where both compositions show a distinct improvement in terms of both burning and explosive characteristics over the propellant alone, the high viscosity oil composition providing the best results.

TABLE 1

Evaluation of Fillers and Diluents for Desensitizing Waste Propellant

| Run No. | (A) Filler | (B) Diluent | (C) Other Additives | Weight % (A)/(B)/(C) | Bureau of Mines Impact (cm/2 kg) | Flame Temp. (°F.) | Castability/Consistency |
|---|---|---|---|---|---|---|---|
| 1 | Walnut Shell | Isopropyl Alcohol | — | 15/24 | 25 | — | Cured medium soft. |
| 2 | Walnut Shell | Isopropyl Alcohol | Thixicin E | 23/27/4.5 | 25 | — | Cured as hard cake. |
| 3 | Walnut Shell | Isopropyl Alcohol | Oxalic Acid | 39/29/2.9 | 16 | — | Powder. |
| 4 | Wheat Flour | Ethylene Glycol | Oxalic acid | 20/38/3.8 | 61 | 1105 | Cured as hard cake. |
| 5 | Wheat Flour | Glycerin | Oxalic Acid | 27/34/5.1 | 93 | 1304 | Did not cure. |
| 6 | Walnut Shell, Wheat Flour | Mineral Oil | Oxalic Acid | (33,18)/22/5.5 | 84 | 1079 | Did not cure. |
| 7 | Walnut Shell, Starch | Mineral Oil | Oxalic Acid | (35,12)/24/5.9 | 87 | 1040 | Did not cure. |
| 8 | Starch | Mineral Oil | Oxalic Acid, | 29/29(7.2,5.8) | 88 | 1284 | Did not cure. |

TABLE 1-continued

Evaluation of Fillers and Diluents for Desensitizing Waste Propellant

| Run No. | (A) Filler | (B) Diluent | (C) Other Additives | Weight % (A)/(B)/(C) | Bureau of Mines Impact (cm/2 kg) | Flame Temp. (°F.) | Castability/Consistency |
|---|---|---|---|---|---|---|---|
| 9 | Almond Shell, Starch | Ethylene Glycol | Thixicin E Ammonium Oxalate, Thixicin E | (6,24)/36/(6,5) | 74 | 1252 | Cured very hard. |
| 10 | Wheat Flour, Starch | Diethylene Glycol | Ammonium Oxalate | (29,19)/19/5 | 94 | — | Did not cure. |
| 11 | Walnut Shell, Wheat Flour | Glycerin | Ammonium Oxalate, Thixicin E | (26,14)/26/(4.4,3.4) | >100 | 1250 | Did not cure. |
| 12 | Pinewood Flour | Glycerin, Isopropyl Alcohol | Ammonium Oxalate | 10/(30,10)/10 | 81 | 1600 | Damp sand. |
| 13 | Hardwood Flour | Glycerin, Isopropyl Alcohol | Ammonium Oxalate | 6/(31,10)/10 | 92 | | Damp sand; did not ignite. |
| 14 | Corncob Flour | Glycerin, Isopropyl Alcohol | Ammonium Oxalate | 6/(31,10)/10 | 76 | 1423 | Damp sand. |
| 15 | Pinewood Flour | Isopropyl Alcohol, Diethylene Glycol | Ammonium Oxalate | 12/(10,29)/10 | 90 | 989 | Damp sand. |
| 16 | Hardwood Flour | Isopropyl Alcohol, Diethylene Glycol | Ammonium Oxalate | 8/(10,31)/10 | 93 | 1131 | Damp sand. |
| 17 | Corncob Flour | Isopropyl Alcohol, Ethylene Glycol | Ammonium Oxalate | 6/(31,10)/10 | 85 | 1183 | Damp sand. |
| 18 | Hardwood Flour, Wheat Flour | Diesel No. 2 | Oxalic Acid Thixatrol ST | (5,11)/26/(2.6,2.6) | 27 | 1743 | Good castability. |
| 19 | Softwood Flour | Diesel No. 2 | Oxalic Acid Thixatrol ST | 7.3/37/(2.4,4.9) | 50 | 1782 | Very good castability. |
| 20 | Corncob Flour | Diesel No. 2 | Oxalic Acid Thixatrol ST | 16/26/(2.6,2.6) | 57 | 1519 | Very good castability. |
| 21 | Hardwood Flour, Cornstarch | Mineral Oil | Thixatrol ST | (5.3,13)/26/2.6 | 60 | 1601 | Good castability. |
| 22 | Corncob Flour | Mineral Oil | Cornstarch | 9.8/37/9.8 | 69 | 1880 | Good castability. |
| 23 | Corncob Flour, Wheat Flour | Mineral Oil | Cornstarch | (4.2,10)/42/2.1 | 73 | 1668 | Very good castability. |
| 24 | — | Water | — | -/50/- | — | — | Non-uniform; water separated. |
| 25 | — | Water | Oxalic Acid | -/65/3.2 | 53 | — | Non-uniform; water separated. |
| 26 | Wheat Flour, Walnut Shell | Diesel No. 2 | — | (12,47)/23/- | >100 | 1403 | Non-uniform. |
| 27 | Corncob Flour | Diesel No. 2 | — | 20/40/- | — | 1660 | Non-uniform. |
| 28 | Wheat Flour, Corncob Flour | Diesel No. 2 | — | (24,15)/37/- | >100 | 1381 | High viscosity. |
| 29 | Corncob Flour | Diesel No. 2 | Thixicin E | 23/48/4.8 | >100 | 1503 | High viscosity. |
| 30 | Corncob Flour | Diesel No. 2 | — | 25/50/- | >100 | 1623 | — |
| 31 | Walnut Shell, Wheat Flour | Diesel No. 2 | — | (38,15)/31/- | >100 | 1462 | — |
| 32 | — | Diesel No. 2 | — | -/67/- | >100 | 1518 | — |
| 33 | Corncob Flour | Diesel No. 2 | Sugar Powder | 25/25/25 | >100 | 1547 | Damp sand. |
| 34 | Walnut Shell, Corncob Flour | Diesel No. 2 | Sugar Powder | (34,9)/23/11 | >100 | 1389 | Damp sand. |
| 35 | Corncob Flour | Valvoline 30SAE | — | 18/50/- | >100 | 1827 | — |
| 36 | Corncob Flour | Corn Oil | — | 23/46/- | >100 | 1538 | — |
| 37 | Corncob Flour | Crisco Vegetable Oil | Myvaplex 600 | 22/43/7 | 85 | 1626 | — |
| 38 | Corncob Flour | ERL 4221, Isopropyl Alcohol | Thixatrol ST | 11/(39,10)/5 | 73 | 1582 | — |
| 39 | Corncob Flour | Valvoline 30SAE | Thixatrol ST | 15/46/8 | 84 | 1615 | — |
| 40 | Corncob Flour | Corn Oil | Myvaplex 600 | 22/43/5.8 | 90 | 1550 | — |
| 41 | Corncob Flour | Diesel No. 2 | — | 25/50/- | — | — | Damp sand. |
| 42 | Corncob Flour | Valvoline 30SAE | — | 25/53/- | — | — | Damp sand. |
| 43 | Hardwood Flour | Mineral Oil (600 Viscosity) | — | 33/33/- | 87.5 | 1961, 1729 | Firm pellets extruded. |
| 44 | Hardwood Flour | Mineral Oil (1200 Viscosity) | — | 33/33/- | >100 | 1481, 1628 | Firm pellets extruded. |

TABLE 2

Evaluation of Hardwood Flour/Mineral Oil Combination For Desensitizing Waste Propellant

| Ingredients | ANB Propellant; Hardwood Flour; 1200 cp Viscosity Oil | ANB Propellant; Hardwood Flour; 600 cp Viscosity Oil | ANB Propellant |
|---|---|---|---|
| Weight Percents | 33/33/33 | 33/33/33 | 100 |
| Burning Characteristics: | | | |
| Maximum Temperature (°F.) | 1481; 1628 (2 runs) | 1961; 1729 (2 runs) | Burned to fast to determine. |

TABLE 2-continued

Evaluation of Hardwood Flour/Mineral Oil Combination
For Desensitizing Waste Propellant

| Ingredients | ANB Propellant; Hardwood Flour; 1200 cp Viscosity Oil | ANB Propellant; Hardwood Flour; 600 cp Viscosity Oil | ANB Propellant |
| --- | --- | --- | --- |
| Time to Consume 100 g (min:sec) | -; 2:44 (2 runs) | 3:35; 2:2 (2 runs) | 0:16.2 |
| Explosive Characteristics: | | | |
| Bureau of Mines Impact Test (cm/2 kg) | >100 | 87.5 | 16.4 |
| DTA Onset Point (°F.) | 409 | 415 | 462 |
| Rotary Friction Test (rpm) | >4000 | >4000 | >4000 |
| Spark Test (Joules) | >1.0 | >1.0 | >1.0 |

The foregoing is offered primarily for purposes of illustration. It will be readily apparent to those skilled in the art that the materials, proportions, operating conditions, and other parameters of the system described herein may be further modified or substituted in various ways without departing from the spirit and scope of the invention.

What is claimed is:

1. A method for desensitizing a solid propellant composition, said method comprising combining said solid propellant composition with the following components:
   (a) an oil having a viscosity of at least about 600 centipoise, and
   (b) solid particulate matter selected from the group consisting of wood particles, nutshell particles, grain flour, starch and corncob particles,
to form a desensitized composition, the proportions of components (a) and (b) in said desensitized composition being sufficient to provide said desensitized composition with an impact sensitivity which is less than about 25% of that of said solid propellant composition, and a flame temperature of at least about 1000° F.

2. A method in accordance with claim 1 in which component (a) is a member selected from the group consisting of petroleum-derived oils and vegetable oils.

3. A method in accordance with claim 1 in which component (a) is a member selected from the group consisting of mineral oil and automotive oils.

4. A method in accordance with claim 1 in which component (a) is an oil having a viscosity of from about 800 to about 1400 centipoise.

5. A method in accordance with claim 1 in which component (a) is an oil having a viscosity of from about 900 to about 1200 centipoise.

6. A method in accordance with claim 1 in which component (b) is a hardwood flour.

7. A method in accordance with claim 1 in which component (a) is mineral oil and component (b) is a hardwood flour.

8. A method in accordance with claim 1 in which said components are combined by mixing together at a temperature of from about 70° F. to about 100° F.

9. A method in accordance with claim 1 in which the proportions of components (a) and (b) in said desensitized composition are such that said desensitized composition has an impact sensitivity which is less than about 25% of that of said solid propellant composition, and a flame temperature of at least about 1500° F.

10. A method in accordance with claim 1 in which the proportions of components (a) and (b) in said desensitized composition are each from about 15% to about 60% by weight.

11. A method in accordance with claim 1 in which the proportions of components (a) and (b) in said desensitized composition are each from about 25% to about 40% by weight.

12. A method in accordance with claim 1 in which component (a) is an oil having a viscosity of from about 900 centipoise to about 1200 centipoise, component (b) is a hardwood flour, and the proportions of components (a) and (b) in said desensitized composition are each from about 25% to about 40% by weight.

13. A method in accordance with claim 1 further comprising forming said desensitized composition into pellets of less than about 1.0 inch in diameter and less than about 2.0 inches in length.

14. A method in accordance with claim 1 further comprising forming said desensitized composition into pellets of less than about 0.5 inch in diameter and less than about 0.5 inch in length.

* * * * *